United States Patent [19]
Lesure

[11] 3,868,556
[45] Feb. 25, 1975

[54] METHOD AND APPARATUS FOR CONVERTING A FORCE OR MECHANICAL MOVEMENT INTO AN ELECTRICAL QUANTITY AND SERVO-SYSTEM EMBODYING SAME

[75] Inventor: Ernest Jacques André Lesure, Paris, France

[73] Assignee: Exaprecis S.A., Paris, France

[22] Filed: Dec. 14, 1972

[21] Appl. No.: 315,022

[30] Foreign Application Priority Data
Dec. 15, 1971 France .............................. 71.45138

[52] U.S. Cl. ................. 318/676, 318/640, 318/653, 324/96
[51] Int. Cl. ........................................ G05b 1/06
[58] Field of Search ........ 318/640, 653, 318/676; 324/96

[56] References Cited
UNITED STATES PATENTS

| | | | |
|---|---|---|---|
| 1,822,075 | 9/1931 | Aronoff .......................... | 318/640 X |
| 1,873,579 | 8/1932 | Haas ................................. | 318/640 |
| 1,957,240 | 5/1934 | Young ............................. | 318/640 X |
| 2,472,019 | 5/1949 | Kinderman ..................... | 318/640 X |
| 2,721,277 | 10/1955 | Boundy et al. .................. | 318/640 X |
| 2,780,101 | 2/1957 | Kinkel ............................. | 318/676 X |
| 2,814,768 | 11/1957 | Kinkel ............................. | 318/676 |
| 2,849,669 | 8/1958 | Kinkel ............................. | 318/676 |
| 2,904,735 | 9/1959 | Cullen et al. .................... | 318/676 |
| 3,249,759 | 5/1966 | Sendro ............................ | 324/96 X |

*Primary Examiner*—Benjamin Dobeck
*Attorney, Agent, or Firm*—Bryan, Parmelee, Johnson & Bollinger

[57] ABSTRACT

The invention relates to a method for converting a force into an electrical quantity according to which a force is applied to the winding of an electro-magnetic assembly to tend to displace it, associated with said winding being an assembly comprising, on one hand, a distributor of energy and, on the other, a source of energy and an element sensitive to this energy producing an electrical current as a function of the energy it receives, one of the means the distributor, the source and the sensitive element, being connected mechanically to the winding, and the sensitive element being connected electrically to the ends of the winding to engender a reaction force which tends to oppose and balance the force applied to the winding, the voltage applied to the winding then constituting the conversion of the force applied to it into an electrical quantity.

3 Claims, 3 Drawing Figures

3,868,556

METHOD AND APPARATUS FOR CONVERTING A FORCE OR MECHANICAL MOVEMENT INTO AN ELECTRICAL QUANTITY AND SERVO-SYSTEM EMBODYING SAME

The invention relates to a method and a device for converting a force into an electrical quantity and the servo-device obtained by the application of this method.

Devices which enable an electrical value to be obtained as a function of a position are already known.

A device of this type can, for example, consist of a potentiometer which provides, between one of the terminals and the cursor, a voltage as a function of the cursor.

However, these potentiometers, even though they are currently used in industry, have a number of disadvantages resulting from their lack of linearity, lack of reliability and high cost, particularly when they must be very accurate and have greater power. In addition, these potentiometers are very bulky.

To overcome these disadvantages, electronic devices were made which enable a position to be translated into an electrical quantity, but these devices are extensive, complex and also bulky.

The object of the present invention is in particular to overcome these disadvantages and to this end, relates to a method for converting a force into an electrical quantity characterized in that the force is applied to a winding of an electromagnetic assembly to tend to displace it, associated with said winding being an assembly comprising, on one hand, a distributor of energy and, on the other, a source of energy producing an electrical current as a function of the energy it receives, one of the means, the distributor, the source and the sensitive element being connected mechanicallly to the winding, and the electrical element sensitive to the energy being connected to the ends of the winding to engender a reaction force which tends to oppose and balance the force applied to the winding, the voltage applied to the winding then constituting the conversion of the force applied to it into an electrical quantity.

The invention also relates to a device for applying this method, characterized in that the winding is constituted by a movable frame of an electro-magnetic assembly mounted pivotally on an axle, the force being applied to the frame by means of an axle which tends to make it pivot.

According to another characteristic feature of the invention, the element sensitive to the energy consists of two sensitive elements placed, with respect to the distributor, in a manner such that, for any relative displacement of the distributor and the sensitive elements, one of these tends to become sensitized while the other tends to be desensitized by this energy.

The invention is illustrated by way of non-limitative examples in the following drawings in which.

The object of the method according to the invention is therefore to convert a force of any kind into an electrical quantity with the aid of a device of simple construction and accurate operation and of low cost, the device, in addition, having a very short response time.

It should be noted, however that the force applied to the converter to produce an electrical quantity in proportion, can come, according to the invention, from a dynamic or static couple, the dynamic couple being obtained for example from any type of measuring instrument and the static couple being obtained, for example, from a manually operated organ, the position of this organ then being translated into a force applied to the converter, this force itself being translated into an electrical quantity.

Likewise, according to the invention, the position translated into a "force" for application to the converter can be constituted, according to the invention, by an angular position.

In addition, the device according to the invention makes use of an assembly comprising generally on one hand, a distributor of energy and, on the other, a source of energy and an element sensitive to this energy, it being obvious that by distributor of energy is meant any device or means such as a screen, prism or electrical screen, while by source of energy is meant an energy of electrical, luminous, calorific or magnetic nature, and while by sensitive element is meant any device capable of being affected by this energy, the object of these means being to produce an electric current as a function of the initial displacement.

Figure 1:
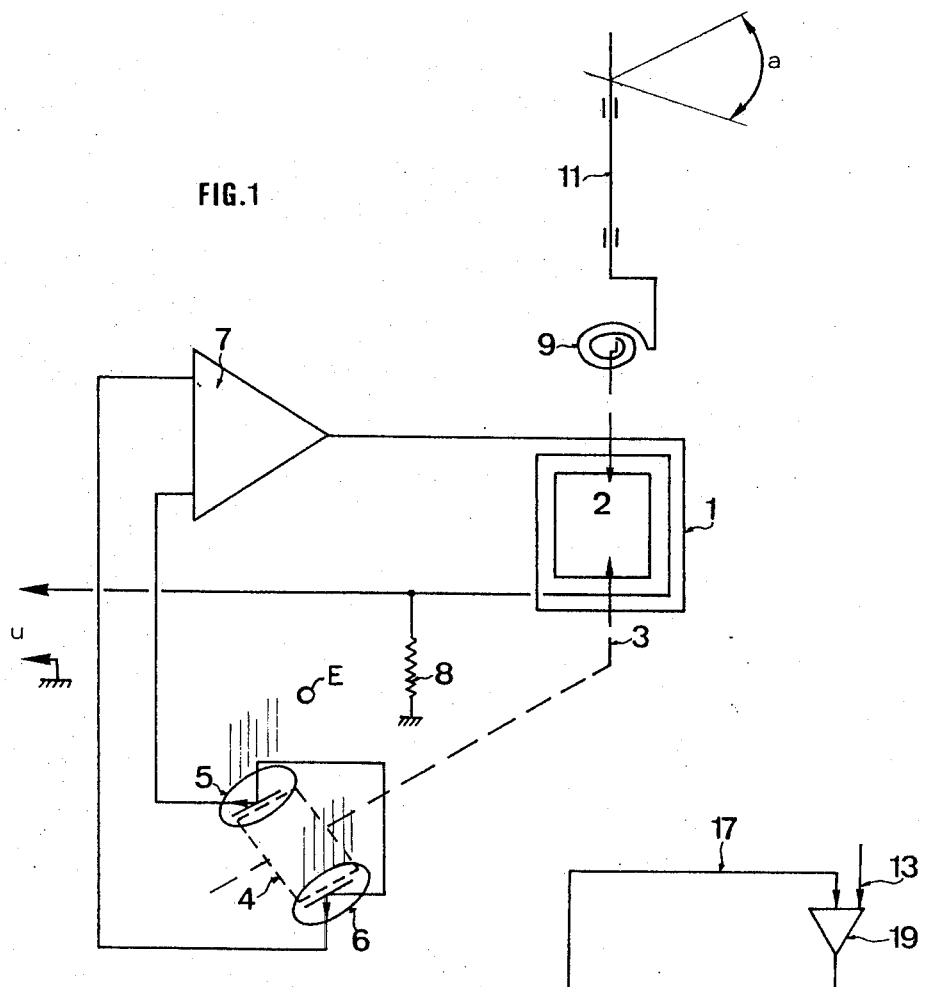
FIG. 1 is a diagram illustrating the method according to the invention.

In the example of construction given in FIG. 1, there is shown a winding 1 which consists of a movable frame of an electro-magnetic assembly, the magnetic part of which has not been shown in the drawings for the sake of greater clarity. This frame comprises axles of pivot points 2 and 3 enabling said frame to be displaced angularly.

It will be seen that the movable frame mounted pivotally is only a particular case and that it is possible, depending on the type of construction envisaged, to use an electro-magnetic assembly winding with a non-pivoting displacement, for example, a linear displacement.

This frame is connected mechanically to a distributor of energy consisting in this example of a screen 4 forming a cup and with which is associated a device sensitive to radiation comprising two sensitive elements 5 and 6.

These sensitive elements 5 and 6, consisting for example of photo-resistors, receive or do not receive a signal coming from a source of energy, not shown, and consisting in the case of photo-resistor cells, of a luminous source.

These sensitive elements 5 and 6 are arranged close to the edges of the cup 4, so that at any moment and for any displacement of the cup 4, one of the sensitive elements tends to be occluded, while, in contrast, the other tends to become sensitized. These two sensitive elements therefore constitute a differential balance and the signals it produces are brought to the differential amplifier 7 the output of which is connected to the winding 1.

It should be noted that, in the device according to the invention, the winding 1 or movable frame, mounted pivotally on the axles 2 and 3, is practically immobile, its position being limited, as will be seen hereafter, by the balance signals coming from the sensitive elements 5 and 6. Some abutments, not shown, can therefore be provided to limit any inappropriate movement of the movable frame 1.

The device operates as folloows:

When a force is applied onto the axles 2 and 3 to make them tend to pivot the frame 1, the cup 4 which is integral with this frame tends also to pivot, in a manner which makes differential signals appear at the terminals of the sensitive elements 5 and 6.

These signals are amplified by the differential amplifier 7 and manifest themselves by a voltage which is applied to the terminals of the winding 1. This voltage then produces in the winding a couple which constantly tends to balance the mechanical force applied onto the axles 2 and 3.

It will therefore be understood that the movable frame 1 remains practically immobile, since, as soon as a force tends to make it pivot, differential signals appear on the sensitized elements 5 and 6, so that the differential amplifier 7 applies an electric voltage proportional to the force to the frame 1.

The voltage U, appearing at the terminals of the resistor 8 connected to the frame 1, is therefore proportional to the mechanical force being applied onto the axles 2 and 3, this voltage automatically creating in the frame 1 a couple which opposes the initial force applied to the frame.

It will be noted in addition that the correct functioning of the device according to the invention is dependent on that the mechanical force applied to the frame 1 be less than the opposing force created by the frame 1 and coming from the differential amplifier 7. Thus it should be possible for the mechanical force applied to the frame 1 to be at any moment less than the maximum opposing force of electrical origin created in this frame, this maximum force depending, taking into consideration the amplification by the differential amplifier 7, on the maximum differential signals obtained by the sensitive elements 5 and 6, when one of the sensitive elements is entirely occluded and the other is entirely sensitized.

As indicated above, the force applied to the frame by the axles 2 and 3 can come from the conversion of a couple or a position, for example, an angular position.

Thus, FIG. 1 shows a spiral spring 9 the inner end of which is connected to the axle 2 and the outer end of which is conneected to a shaft 11 mounted pivotally and axially by a handle 10.

If, in this device, the shaft 11 is made to pivot throught an angle $a$, the spiral spring translates a couple to the axle 2 and thus to the frame 1 which tends to pivot.

This couple is balanced automatically by an opposing couple of electrical origin, so that there appears a voltage U as a function of the value of the couple exerted on the shaft 11 and making an angle $a$.

The organ exerting the couple on the shaft 11 can be of any type, for example it can consist of a rotary vane, a valve or any device operating by mechanical, electric or fluid means of which the position or the couple is to be transformed into an electrical quantity.

Thus, in the case where it is desired to translate a position into an electrical quantity, a handle can be provided fixed to the shaft 11, the angular position of this handle then determining a force applied to the frame 1 so that a voltage U appears as a function of the position of the handle.

Similarly, FIG. 1 shows a spring 9 made in the form of a spiral. This spiral, however, can be constituted by a coil spring since the purpose of this spring is to transform the displacement which it is made to make into a force exerted on the frame and manifest it by a voltage U proportional to this displacement.

The device according to the invention can therefore be applied in all case where it is desired to obtain a voltage proportional to a force, a couple, a displacement, a position, etc., these various factors being derivable from any apparatus and the rsultant electrical voltage used to transmit a signal to any apparatus used, for checking, as a servo-system or for setting off a safety arrangement.

Figure 2:
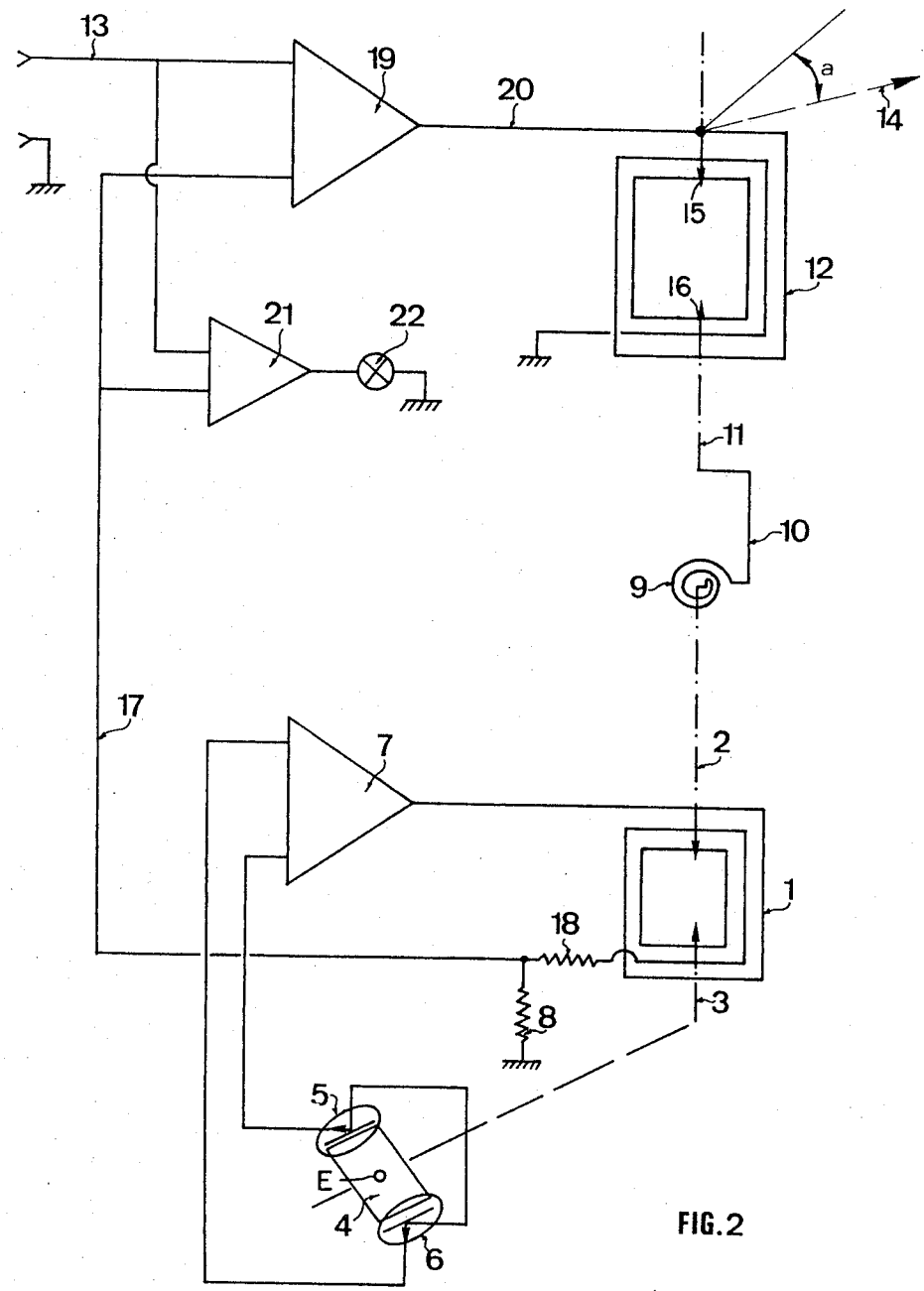
FIG. 2 is a diagram of a device for converting an angular value into an electrical quantity.

FIG. 2 shows a device for the servo-control of a measuring instrument, the movable frame of which is shown at 12. The reading given by this measuring instrument being under servo-control of the elctrical quantity to be measured brought by the conductor 13, any difference between the reading on the measuring instrument and the quantity to be measured revealed, qualitatively and quantitatively, and thus making it possible to control a safety device signalling the malfunctioning of the apparatus whatever the cause of the malfunctioning may be.

In the example in FIG. 2, this device is provided with a movable frame 1, coupled to the assembly comprising a screen 4 and the sensitive elements 5 and 6, these elements being in addition connected electrically to the frame 1 by means of the differential amplifier 7. This frame 1 is coupled to the movable frame 12 of a measuring instrument the indicator needle of which is shown at 14. The pivot axles 15,16 of this frame 12 are coupled mechanically, either directly or indirectly, to the shaft 11 connected to the outer end of the spiral spring 9 by the handle 10.

In addition, the movable frame 1 of the convertor device is connected, by means of a conductor 17 and by means of a divider bridge comprising the resistors 18 and 8, to a differential amplifier 19. The value of the divider bridge comprising the resistors 18 and 8 is determined in a manner such that the voltage coming from the frame 1 and brought to a differential amplifier 19 corresponds to the nearest proportionality factor to the signal introduced into the conductor 13 in this differential amplifier 19.

The signal introduced by 13 into the differential amplifier 19 is brought into the movable frame 12 so as to deflect the needle 14 of this indicator apparatus by an angle $a$ as a function of the signal introduced at 13. The frame 12 having been deflected through an angle $a$ therefore causes the shaft 11 to pivot resulting in a tensioning of the spiral spring 9 in a way such that a force corresponding to the signal introduced at 13 is applied to the frame 1. However, this frame 1 remains in a balanced position as was seen above, by means of the differential amplifier 7, an electrical voltage creating a force which opposes at every moment the mechanical force applied to the frame 1 by the pivot axle 2.

However, this converter device produces in the conductor 17, and on account of the divider bridge 18–8, a voltage comparable to the signal introduced at 13, in a manner such that if the deflection $a$ of the needle 14 corresponds to the signal introduced at 13, the voltage appearing on the conductor 17 is equal to this signal, to the nearest proportionality factor, so that the signal leaving the amplifier 19 is a function of this proportionality factor.

It should also be stated that this proportionality factor results from the presence of the spring 9 in the translation of the position of the frame 12 to the frame 1, and corresponds, for each position of the frame 12 and therefore of the spring 9, to a voltage appearing at the output of the amplifier 19 so that it induces the frame 12 to maintain the spring 9 in a tensioned state, corresponding to the signal introduced at 13.

It will therefore be understood that the mechanical tension of the spring 9, after the signal introduced at 13 has caused the frame 12 to be deflected, is maintained solely by a voltage resulting from this proportionality factor and appearing at the output of the amplifier 19 to maintain the frame 12 in balance.

On the other hand, if for any reason, the frame 12 is not deflected by a value corresponding to the value of the signal 13, the mechanical force applied to the frame is different and the voltage appearing on the conductor 17 also is different. The differential amplifier 19 then detects this difference between the signal introduced at 17 and 13, so as to tend to produce a signal introduced by the conductor 20 into the movable frame 12 to make it pivot through an angle $a$ corresponding to the value of the signal introduced at 13.

It is seen therefore that the reading of the needle 14 follows the signal introduced at 13 and that, if the measure or reading is not correct, an error signal appears between the conductors 17,13.

This error voltage can then be used to set off a malfunction indicator which reveals this malfunctioning and which actuates some kind of safety device.

Thus, in the example of construction in FIG. 2, a differential amplifier has been provided at 21 which receives signals from the conductors 13 and 17 and which qualitatively and/or quantitatively detects the error between the two signals taking the porportionality factor into account.

The differential amplifier 21 can then, for example actuate a luminous indicator 22 constituting an alarm signal or an indicator apparatus revealing the value of the error.

Such a device can therefore be used in all cases where the good functioning of an mechanical, electrical, hydraulic or other device must be controlled with precision.

Thus, for example, in aircraft where the malfunctioning of an indicator instrument can have disastrous consequences, it is possible to associate with these measuring instruments one or several converters according to the invention, so tat at any moment the pilot can satisfy himself that his instruments are operating satisfactorily.

Likewise, the voltage coming from frame 1 can be used to process imformation.

Figure 3:
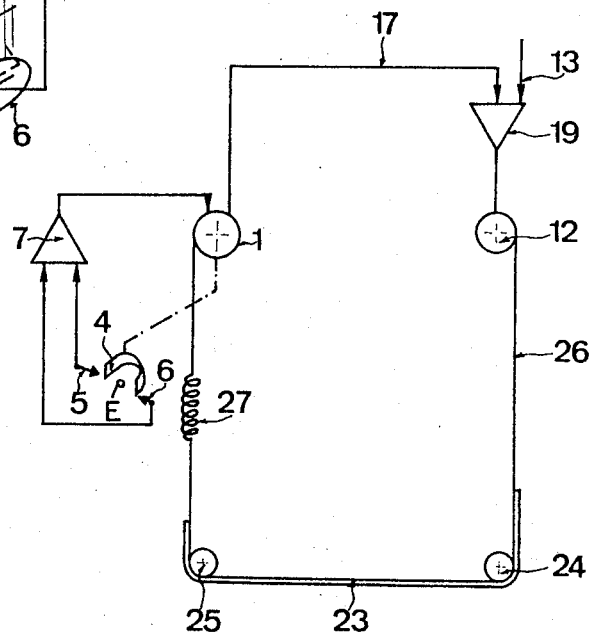
FIG. 3 represents a device for converting a position into an electrical quantity.

In the example in FIG. 3 another mode of construction is shown. In this case, the indicator instrument 12 comprises an indicator means consisting of a graduated tape passing over the pulleys 24, 25, this graduated tape moving in front of a fixed reference point (not shown). The tape 23 is connected by one of its ends to an indicator instrument 12 by means of a cable 26, while mechanically it is connect to the movable frame 1 of the converter device by means of the coil spring 27, translating the couple of the frame 12 or the position of the tape 23 into a force applied to the frame 1. This force is translated by the semi-cylindrical cup 4 which is integral with the frame 1 and by the associated sensitive elements 5 and 6 into an electrical voltage defined by the differential amplifier 7 and which is brought to the frame 1.

The signal passing through the frame 1 is then brought to the differential amplifier 19 by the conductor 17 in order to servo-control the frame 12.

The device illustrated in FIG. 2 is therefore similar, as far as principle is concerned to that shown in FIG. 2, the only modification being in the indicator means of the frame 12 (tape 13 instead of needle 14) and in the nature of the springs 27, 29 transforming the couple of the frame 12 or the position of the tape 23 into a force in the frame 1.

It will also be noted that the device according to the invention is based on a principle which provides the conditions which facilitate the construction of rapid response devices, that is devices in which the force applied varies very rapidly since this force is under servo-control at every moment.

It is obvious that the invention is not limited to the examples of its embodiment herin above described and illustrated, and that on the basis of it other modes and method of its embodiment can be envisaged without departing from the scope of the invention.

What is claimed is:

1. A servo-device comprising a first electro-magnetic assembly including a first movable frame carrying a first winding, said frame being pivotally mounted to turn about an axis, a second electro-magnetic assembly including a second movable frame carrying a second winding, said second frame being pivotally mounted to turn about an axis, a spring mechanically interconnected between said first and second movable frames, whereby the angular displacement of said second movable frame acts through said spring to tend to displace said first movable frame about its axis together with said first winding, said first frame and winding being mechanically associated with an assemblage comprising a source of energy, a differential sensitive means responsive to that energy for producing an electrical current as a function of the energy received by said differential sensitive means, and a distributor of the energy for varying the energy received by the differential sensitive means as a function of the relative positions of the energy source, the distributor and the differential sensitive means, said first movable frame being mechanically connected to said assemblage for varying the energy received by said differential sensitive means as a function of the displacement of said first movable frame and winding, a frist differential amplifier, said differential sensitive means being electrically connected through said first differential amplifier to said first winding for feeding an electrical signal to said first winding as a function of the energy received by said differential sensitive means for creating a turning force on the first winding which tends to oppose and to balance the displacement force being exerted through said spring onto said first movable frame, a second differential amplifier adapted to receive an electrical input signal from an external source, said second differential amplifier having its output electrically connected to said second winding for producing angular displacement of said second frame as a function of the electrical input signal from said external source, and said first winding being electrically connected to the input of said second differential amplifier for feeding an electrical signal back from said first winding to said second differential amplifier for servo-controlling the angular displacement of said second movable frame.

2. A servo device as claimed in claim 1 in which a third differential amplifier is connected for receiving the electrical input signal from the external source and for receiving the electrical signal being fed back from said first winding for comparing said two signals, and said third differential amplifier having indicator apparatus associated therewith for signaling any proportionality difference between the two signals being compared.

3. A servo device as claimed in claim 1 in which a divider bridge is electrically connected between said first winding and the input of said second differential amplifier for equalizing to the nearest proportionality factor the signal being fed back from said first winding with the input signal from the external source.

* * * * *